United States Patent
Tanaka et al.

(10) Patent No.: US 8,448,624 B2
(45) Date of Patent: May 28, 2013

(54) DIRECT INJECTION INTERNAL COMBUSTION ENGINE

(75) Inventors: Dai Tanaka, Okazaki (JP); Koji Hata, Okazaki (JP); Kazuyoshi Nakane, Okazaki (JP); Kimihiko Sato, Okazaki (JP); Shigeo Yamamoto, Obu (JP)

(73) Assignee: Mitsubishi Jidosha Kogyo Kabushiki Kaisha, Tokyo (JP)

( * ) Notice: Subject to any disclaimer, the term of this patent is extended or adjusted under 35 U.S.C. 154(b) by 33 days.

(21) Appl. No.: 12/529,806

(22) PCT Filed: Mar. 13, 2008

(86) PCT No.: PCT/JP2008/054577
§ 371 (c)(1),
(2), (4) Date: Sep. 3, 2009

(87) PCT Pub. No.: WO2009/004838
PCT Pub. Date: Jan. 8, 2009

(65) Prior Publication Data
US 2010/0012083 A1    Jan. 21, 2010

(30) Foreign Application Priority Data
Jun. 29, 2007 (JP) ................................. 2007-172033

(51) Int. Cl.
*F02B 3/00* (2006.01)
*F02B 5/00* (2006.01)

(52) U.S. Cl.
USPC .......................................... 123/298; 123/305

(58) Field of Classification Search
USPC ................... 123/295, 305, 266, 309, 608, 298
See application file for complete search history.

(56) References Cited

U.S. PATENT DOCUMENTS

| | | | | |
|---|---|---|---|---|
| 4,029,075 A | * | 6/1977 | Noguchi et al. | 123/266 |
| 4,974,565 A | | 12/1990 | Hashimoto et al. | |
| 5,605,125 A | * | 2/1997 | Yaoita | 123/275 |
| 6,363,909 B1 | * | 4/2002 | Tomoda et al. | 123/295 |
| 2006/0096571 A1 | * | 5/2006 | Tourteaux et al. | 123/266 |
| 2006/0102141 A1 | * | 5/2006 | Nakayama et al. | 123/298 |
| 2006/0231065 A1 | * | 10/2006 | Pontoppidan | 123/305 |

FOREIGN PATENT DOCUMENTS

| | | |
|---|---|---|
| EP | 1 079 081 A2 | 2/2001 |
| JP | 63-112789 U | 7/1988 |
| JP | 1-134732 U | 9/1989 |

(Continued)

OTHER PUBLICATIONS

Korean Office Action issued in Korean Patent Application No. 10-2009-7026957 on Sep. 5, 2011.
Japanese Office Action issued in Japanese Patent Application No. 2009-521542 on Feb. 8, 2012.

*Primary Examiner* — Stephen K Cronin
*Assistant Examiner* — Sizo Vilakazi
(74) *Attorney, Agent, or Firm* — Birch, Stewart, Kolasch & Birch, LLP

(57) ABSTRACT

A direct injection internal combustion engine employs a spray guided combustion method, wherein a fuel spray injected from a fuel injection valve is collected at an electrode section of a spark plug so that satisfactorily high combustion performance may be achieved even with a small amount of injected fuel. The engine includes spray control posts 30 arranged on both sides of the spark plug 5, for guiding the fuel injected from the fuel injection valve 4 to be directed toward the electrode section 10 of the spark plug 5.

3 Claims, 7 Drawing Sheets

FOREIGN PATENT DOCUMENTS

| | | |
|---|---|---|
| JP | 2-26729 U | 2/1990 |
| JP | 07-259705 A | 10/1995 |
| JP | 2002-30938 A | 1/2002 |
| JP | 2002030938 A * | 1/2002 |
| JP | 3295975 B2 | 4/2002 |
| JP | 2004-44427 A | 2/2004 |
| JP | 2005-180202 A | 7/2005 |
| JP | 2006-291798 A | 10/2006 |
| JP | 2006-291839 A | 10/2006 |
| JP | 3903604 B2 | 1/2007 |

* cited by examiner

DIRECT INJECTION INTERNAL COMBUSTION ENGINE

BACKGROUND OF THE INVENTION

1. Field of the Invention

The present invention relates to direct injection internal combustion engines, and more particularly, to the configuration of an internal combustion engine employing a spray guided combustion method.

2. Description of the Related Art

The spray guided combustion method is known as a combustion method for direct injection internal combustion engines. In a direct injection internal combustion engine using the spray guided combustion method, a spark plug is arranged such that an electrode section thereof is located within or near a fuel injection region where a fuel spray is injected from a fuel injection valve to produce an air-fuel mixture, and the air-fuel mixture thus produced is ignited by the spark plug while passing near the electrode section. With the spray guided combustion method, a relatively rich air-fuel mixture can be formed in the vicinity of the electrode section while the mixture in other regions remote from the electrode section can be made ultra lean, thus enabling what is called stratified lean burn to take place inside a cylinder by means of an air-fuel mixture which is lean as a whole, while at the same time ensuring satisfactory combustion stability, whereby the fuel consumption can be improved.

Generally, the electrode section of the spark plug is constituted by a center electrode and a rod-shaped ground electrode (hereinafter referred to as side electrode) arranged on one side of the center electrode. In the direct injection internal combustion engine using the spray guided combustion method, fuel is injected from one side of the electrode section. Thus, depending on the position of the side electrode, the side electrode may obstruct the passage of the fuel spray, possibly making it difficult for the fuel to reach the electrode section. It is therefore desirable that the spark plug should be fixed in an angular position such that the side electrode does not hinder the supply of the fuel to the electrode section. However, since the spark plug is mounted to a cylinder head of the engine with an external thread thereof screwed into an internal thread cut in the cylinder head, it is difficult to fix the spark plug so that the side electrode may invariably be located at a given rotational angular position. Where the internal combustion engine is a single-cylinder engine, even if the side electrode of the spark plug is not located exactly at the given rotational angular position, acceptable combustion stability can be obtained by appropriately setting the fuel injection timing or the ignition timing in accordance with the actual rotational angular position of the side electrode. In the case of a multi-cylinder engine, on the other hand, the rotational angular position of the side electrode of the spark plug can vary from cylinder to cylinder, possibly making it difficult to set the ignition timing and the injection timing.

To eliminate the inconvenience, a technique facilitating the setting of the ignition timing and injection timing of a multi-cylinder direct fuel injection internal combustion engine has been developed, as disclosed in Japanese Laid-open Patent Publication No. 2006-291798. According to this technique, a cylindrical shroud is provided at the distal end of the spark plug so as to surround the electrode section, and a plurality of fuel spray passage holes are formed in the shroud at regular intervals in a circumferential direction of same so that fuel may be supplied to the electrode section with uniform efficiency regardless of the rotational angular position of the side electrode of the spark plug.

Where the electrode section is surrounded by the cylindrical shroud as disclosed in Japanese Laid-open Patent Publication No. 2006-291798, vaporization of the fuel is accelerated by the shroud, but since the size of the individual fuel spray passage holes that can be formed in the shroud is limited, it cannot be said that the fuel spray is efficiently supplied to the electrode section.

SUMMARY OF THE INVENTION

The present invention was made to solve the above problems, and an object thereof is to provide a direct injection internal combustion engine in which a fuel spray injected from a fuel injection valve is caused to collect at an electrode section, thereby ensuring sufficiently high combustion stability even with a small amount of injected fuel.

To achieve the object, the present invention provides a direct injection internal combustion engine comprising: a fuel injection valve for injecting fuel directly into a combustion chamber; and a spark plug including an electrode section arranged near an injection path along which a fuel spray injected from the fuel injection valve passes, the fuel spray injected from the fuel injection valve being ignited when the fuel spray passes near the electrode section, wherein the internal combustion engine further comprises a guide member for guiding the fuel injected from the fuel injection valve toward regions laterally outward of the spark plug to be directed to the electrode section.

In the direct injection internal combustion engine of the present invention, out of the fuel injected from the fuel injection valve, part of the fuel directed laterally outward of the spark plug is also guided to the electrode section by the guide member. Thus, the fuel spray is collected and guided to the electrode section, so that a sufficiently rich air-fuel mixture can be formed near the electrode section even if the amount of injected fuel is small, making it possible to ensure satisfactorily high combustion stability.

The guide member is preferably arranged on either side of the electrode section such that a line connecting an injection nozzle of the fuel injection valve and the electrode section is located between the guide members.

With this arrangement, the air-fuel mixture formed by the fuel spray is guided by the guide members such that flows of the mixture enter the electrode section from both sides. At the electrode section, therefore, the flows of the mixture collide with each other, while canceling each other's flow velocity out, and stagnate in the vicinity of the electrode section, whereby a spark, or an arc discharge, is prevented from being blown out by the high-speed flow of the mixture or air, making it possible to improve the ignition performance.

Preferably, the guide member is a pair of post-like members arranged on a portion of a cylinder head fitted with the spark plug, so as to correspond in position to the combustion chamber. Thus, the guide member is simple in structure and can be formed with ease.

Further, the pair of post-like members are preferably arranged on both sides of the electrode section, respectively, and have respective side faces facing the injection nozzle of the fuel injection valve.

In this case, the fuel injected from the fuel injection valve can be collected and guided to the electrode section with a simple arrangement. Also, the fuel spray injected from the fuel injection valve collides against the side faces of the post-like members. Thus, especially when the temperature of the post-like members is high, vaporization of the fuel is accelerated, making it possible to improve the combustion stability.

Preferably, moreover, the pair of post-like members are arranged near the electrode section such that a side face of one of the post-like members faces a side face of the other of the post-like members.

Also in this case, the fuel injected from the fuel injection valve can be collected and introduced to the electrode section with a simple arrangement. Further, since the fuel spray injected from the fuel injection valve collides against the side faces of the post-like members, vaporization of the fuel is accelerated especially when the temperature of the post-like members is high, making it possible to improve the combustion stability.

According to the present invention, the direct injection internal combustion engine may further comprise a wall member located on the line connecting between the injection nozzle of the fuel injection valve and the electrode section, for obstructing passage of the fuel spray.

With this arrangement, the wall member serves to prevent the fuel spray from flowing from the fuel injection valve directly into the electrode section and also serves as a flow obstructing wall, whereby the arc discharge is prevented from being blown out by the fuel spray.

DETAILED DESCRIPTION OF THE INVENTION

Embodiments of the present invention will be described below with reference to the accompanying drawings.

Figure 1:
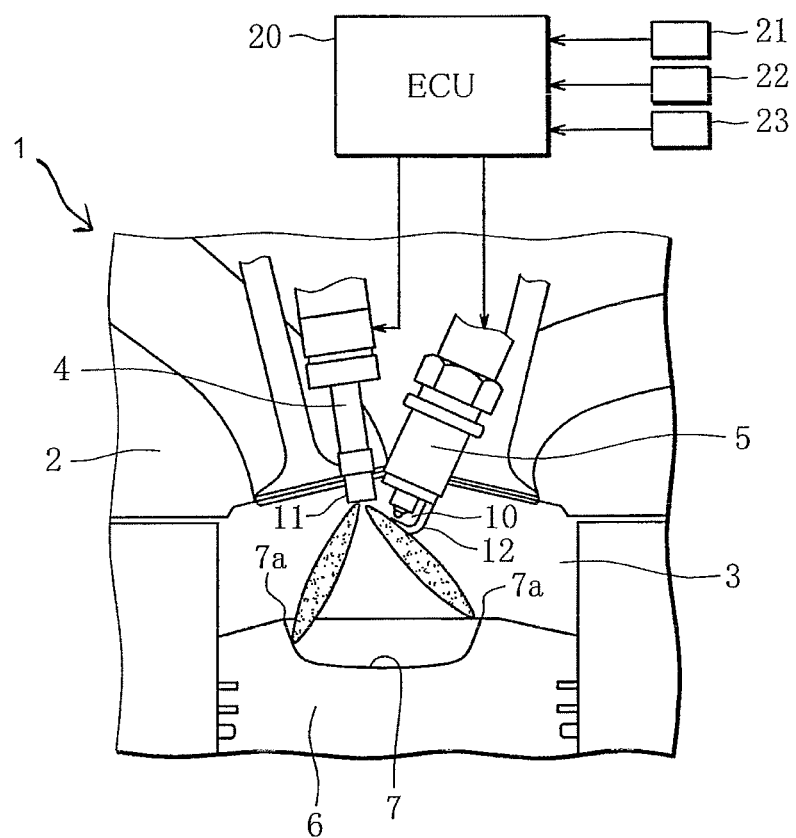
FIG. 1 illustrates a schematic configuration of a direct fuel injection engine according to the present invention.

FIG. 1 schematically illustrates the internal configuration of an engine 1 (internal combustion engine) according to the present invention.

The engine 1 of this embodiment, shown in FIG. 1, is a multi-cylinder direct fuel injection engine using the spray guided combustion method. A cylinder head 2 is mounted with a fuel injection valve 4 and a spark plug 5 for each of the cylinders such that the fuel injection valve 4 and the spark plug 5 face the interior of a corresponding combustion chamber 3. A cavity 7, which is in the form of a cylindrical recess, is formed in the upper surface of each piston 6 of the engine 1 approximately at a central portion of the upper surface.

The fuel injection valve 4 has directivity in its fuel injection and injects a spray of fuel like a curtain, or in the form of a cone, toward an edge 7a of the cavity 7 in such a manner that part of the fuel spray passes a region including the distal end of the spark plug 5. The spark plug 5 is screwed into and fixed in an internal thread cut in the cylinder head 2 and has an electrode section 10 at its distal end for generating an arc discharge. The electrode section 10 is located near an injection nozzle 11 of the fuel injection valve 4. Also, the spark plug 5 has a rod-shaped side electrode 12 located on one side of the electrode section 10 and constituting part of the electrode section 10.

The spark plug 5 and the fuel injection valve 4 are electrically connected to an ECU 20. The ECU 20 is also electrically connected with sensors such as a rotational speed sensor 21 for detecting the rotational speed of the engine 1, a throttle sensor 22 for detecting the throttle opening of the engine 1, and an accelerator position sensor 23 for detecting the amount of operation of an accelerator pedal. Based on the information supplied from the sensors, the ECU 20 controls the quantity of fuel to be injected from the individual fuel injection valves 4, fuel injection timing, and ignition timing of the individual spark plugs 5.

Figure 2A:
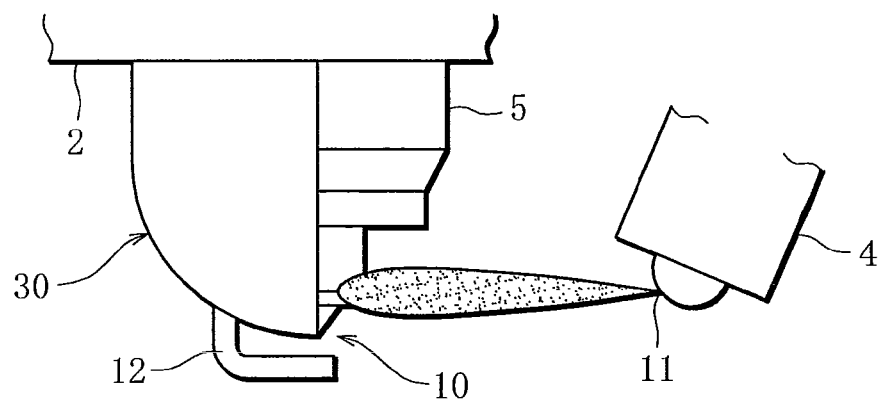
FIG. 2A is a front view of an upper part of a combustion chamber according to a first embodiment of the present invention.
Figure 2B:
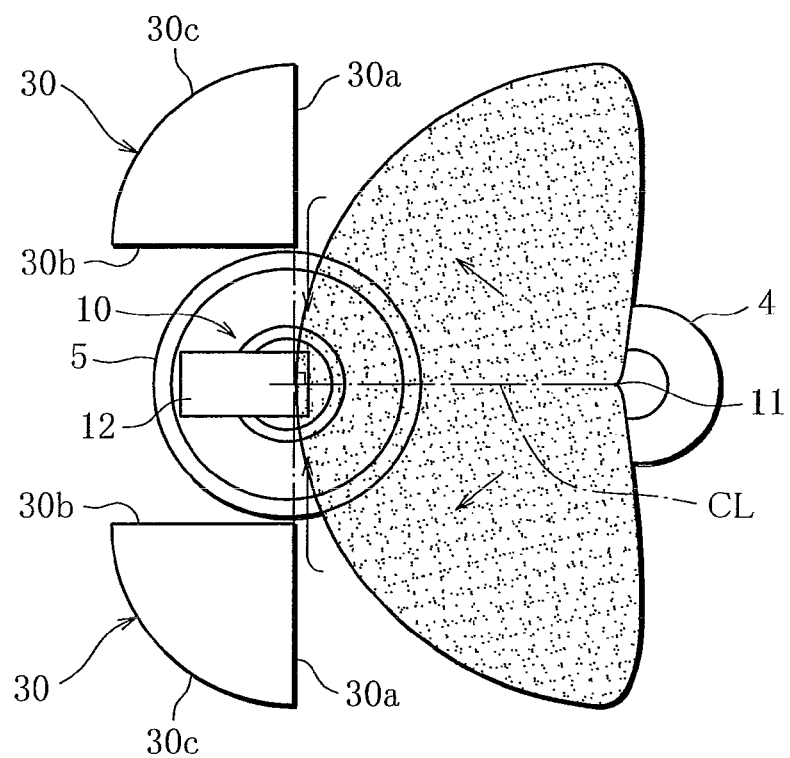
FIG. 2B shows the upper part of the combustion chamber of the first embodiment as viewed from below.

FIG. 2A is a front view of an upper part of the combustion chamber according to the first embodiment of the present invention, and FIG. 2B shows the upper part of the combustion chamber of the first embodiment as viewed from below.

In this embodiment, two spray control posts 30 (guide member) as post-like members are arranged on both sides of the spark plug 5, respectively, with the electrode section 10 located therebetween, as shown in FIGS. 2A and 2B. Each of the spray control posts 30 extends downward from the lower surface of the cylinder head 2 to such a vertical position that a tip thereof is situated at nearly the same level as a line CL connecting between the electrode section 10 at the distal end of the spark plug 5 and the injection nozzle 11 of the fuel injection valve 4. Each spray control post 30 has a fan-shaped cross-sectional form with a central angle of 90° and has first and second side faces 30a and 30b, both flat, and a curved third side face 30c.

The spray control posts 30 are arranged such that their first side faces 30a are located on both sides of the electrode section 10 and directed perpendicularly to the line CL connecting between the injection nozzle 11 of the fuel injection valve 4 and the electrode section 10 so as to face the injection nozzle 11. The second side faces 30b of the spray control posts 30 are located on both sides of the electrode section 10 and extend parallel with the line CL connecting the injection nozzle 11 and the electrode section 10 in a direction away from the injection nozzle 11.

Also, the fuel spray is injected from the fuel injection valve 4 so that at least part of the injected fuel spray may be directed to the spray control posts 30, as shown in FIG. 2B.

Figure 3:
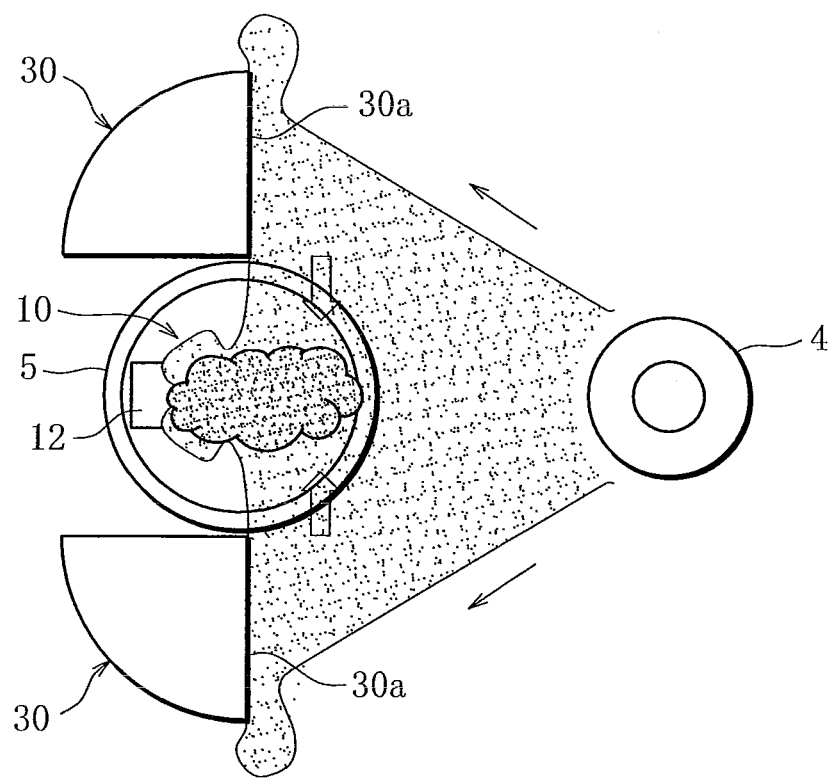
FIG. 3 illustrates the manner of how an air-fuel mixture is formed at an electrode section.

FIG. 3 illustrates the manner of how an air-fuel mixture is formed at the electrode section 10.

In this embodiment configured as described above, the fuel spray injected from the fuel injection valve 4 collides against the first side faces 30a of the spray control posts 30, as depicted in FIG. 3, thus forming an air-fuel mixture. Part of the air-fuel mixture formed in this manner is guided along the first side faces 30a toward the electrode section 10. The flows of the mixture flowing from the two spray control posts 30 in opposing directions collide with each other in the vicinity of the electrode section 10 and stagnate like a cloud near the electrode section 10. When an arc discharge is generated at the electrode section 10, the mixture stagnating near the electrode section 10 is ignited.

As described above, in this embodiment, the fuel spray injected from the fuel injection valve 4 collides against the first side faces 30a of the spray control posts 30, and because of the heat of the spray control posts 30, vaporization of the air-fuel mixture is furthered. Consequently, smoldering combustion at the electrode section 10 of the spark plug 5 is suppressed, thus improving the ignition performance. Also, the spray control posts 30 located on both sides of the spark plug 5 serve to block the fuel spray injected from the fuel injection valve 4 and allow part of the injected fuel spray to be guided along the first side faces 30a toward the electrode section 10, making it possible to collect the fuel spray at the electrode section 10. Thus, even if the fuel injection direction varies due to manufacturing fluctuation of the fuel injection valve 4 or with the lapse of time, a sufficient amount of fuel can be supplied to the electrode section 10, enabling reliable ignition of the mixture even with a small amount of injected fuel. Further, the flows of the mixture guided in the opposing directions collide with each other at the electrode section 10, and thus the flow velocities cancel each other out and become lower. It is therefore possible to prevent the arc discharge from being blown out by the high-velocity flow of the mixture, making it possible to improve the ignition performance. Accordingly, the service life of the spark plug 5 can be prolonged by saving the ignition energy of the spark plug 5, and it is also possible to improve the ignition stability which is liable to deteriorate due to the high-velocity flow of the fuel spray or of air current when the spray guided combustion method is used.

In this embodiment, moreover, the fuel spray injected from the fuel injection valve 4 collides against the first side faces 30a of the spray control posts 30, rather than directly reaching the electrode section 10, and creates flows of the fuel spray that are guided to the electrode section 10 from both sides of same. Thus, even if the side electrode 12 is located on the line CL connecting between the electrode section 10 and the injection nozzle 11 of the fuel injection valve 4, the side electrode 12 stays away from the fuel guide path and does not hinder the introduction of the fuel, enabling a sufficient amount of fuel to reach the electrode section 10. Also, if the side electrode 12 is located on the path leading from the first side face 30a of one spray control post 30 to the electrode section 10, the fuel spray can be guided along the path leading from the other spray control post 30 to the electrode section 10. Accordingly, adequate supply of the fuel spray from the fuel injection valve 4 to the electrode section 10 is ensured regardless of at which rotational angular position the side electrode 12 is located after the spark plug 5 is screwed in and fixed.

Figure 4A:
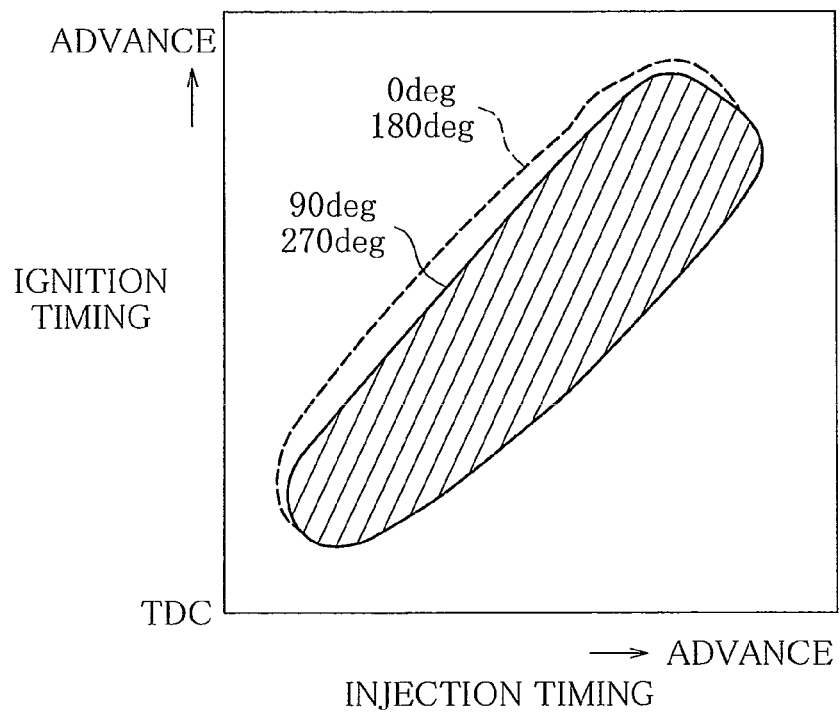
FIG. 4A is a graph showing the relationship, obtained with the first embodiment of the present invention, between the position of a side electrode and a stable combustion region expressed in terms of injection timing and ignition timing.
Figure 4B:
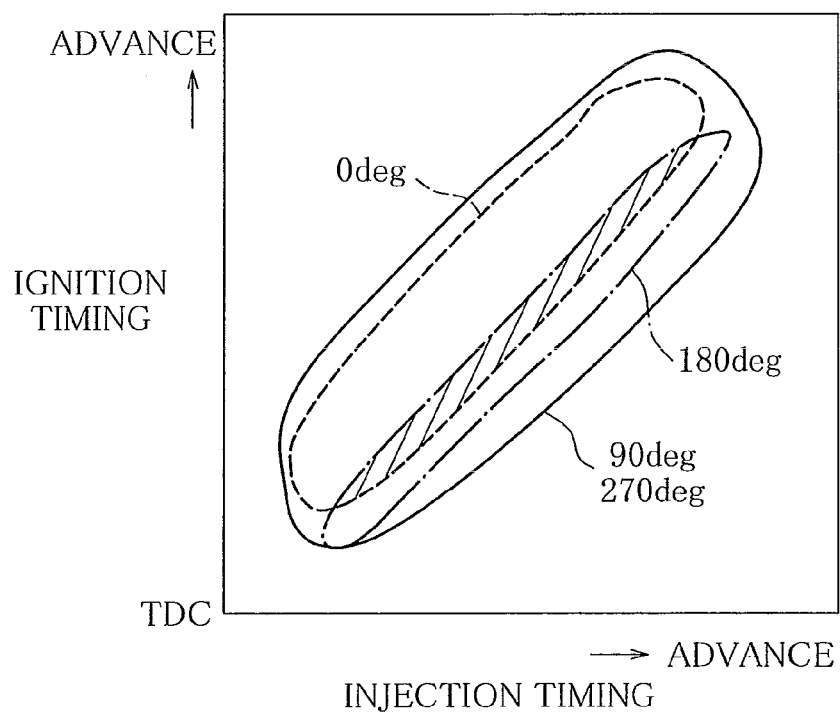
FIG. 4B is a graph showing the relationship, obtained with a conventional configuration with no spray control posts, between the position of the side electrode and the stable combustion region expressed in terms of injection timing and ignition timing.

FIG. 4A is a graph showing the relationship, obtained with the first embodiment of the present invention, between the angular position of the side electrode 12 and a stable combustion region expressed in terms of injection timing and ignition timing. FIG. 4B is a graph illustrating, as a comparative example, the relationship between the angular position of the side electrode 12 and the stable combustion region expressed in terms of injection timing and ignition timing, obtained with a conventional configuration not provided with the spray control posts 30. In the graphs, "180 deg" indicates the angular position of the side electrode 12 wherein the side electrode 12 is located on the line CL connecting between the electrode section 10 and the injection nozzle 11 of the fuel injection valve 4, and "0 deg" indicates the angular position (shown in FIGS. 2A and 2B) wherein the side electrode 12 is located on exactly the opposite side with respect to the injection nozzle 11.

Where the spray control posts 30 are not provided as in the conventional configuration illustrated in FIG. 4B, the side electrode 12 blocks passage of the fuel spray when located at the rotational angular position "180 deg", making it difficult for the fuel spray to reach the electrode section 10. As a result, the stable combustion region is narrowed. In the conventional configuration, therefore, in order to achieve stable combustion with a multi-cylinder engine irrespective of the angular position of the side electrode 12, the injection timing and the ignition timing need to be set to fall within the very narrow range indicated by hatching in the figure, and thus practicality is low. On the other hand, according to the embodiment illustrated in FIG. 4A, stable combustion is ensured over a wide range regardless of the rotational angular position of the side electrode 12, making it easier to set the injection timing and the ignition timing.

Figure 5A:
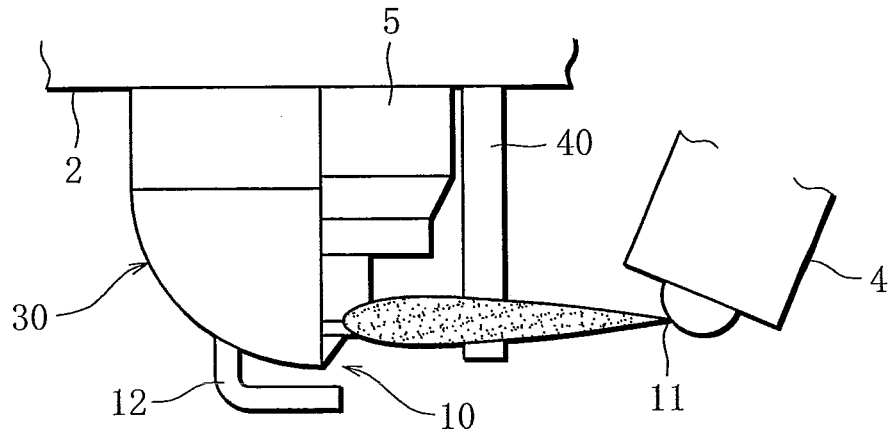
FIG. 5A is a front view of an upper part of a combustion chamber according to a second embodiment of the present invention.
Figure 5B:
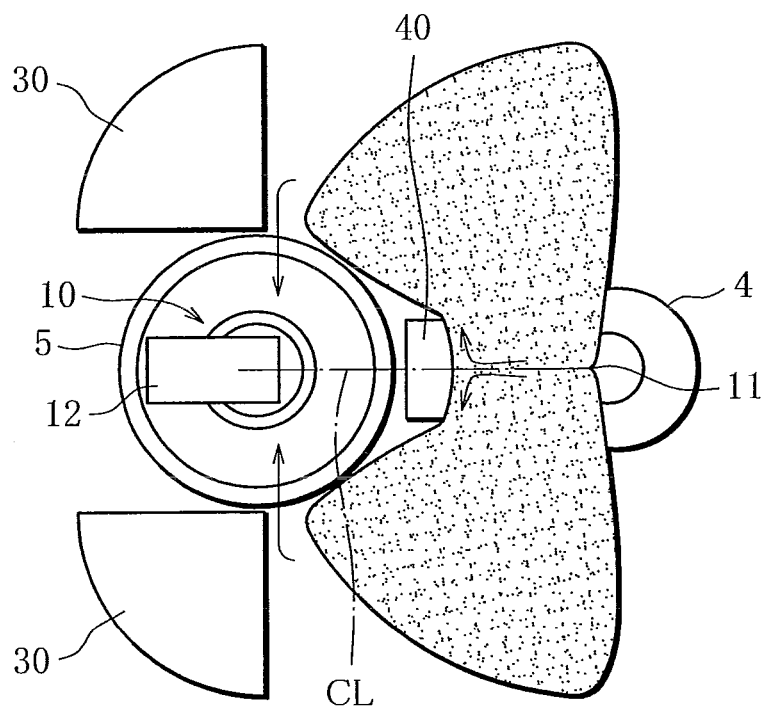
FIG. 5B shows the upper part of the combustion chamber of the second embodiment as viewed from below.

FIG. 5A is a front view of an upper part of a combustion chamber according to a second embodiment of the present invention, and FIG. 5B shows the upper part of the combustion chamber of the second embodiment as viewed from below.

As seen from FIGS. 5A and 5B, the second embodiment differs from the first embodiment in that a flow obstructing wall 40 (wall member) is additionally provided which is located on the line CL connecting between the electrode section 10 and the injection nozzle 11 of the fuel injection valve 4 to block the passage of the fuel spray or of an air current induced by the fuel spray. The flow obstructing wall 40 keeps the fuel spray from flowing directly to the electrode section 10, making it possible to reliably prevent the arc discharge from being blown out by the fuel spray and also to prevent smoldering combustion from taking place at the spark plug 5.

Figure 6:
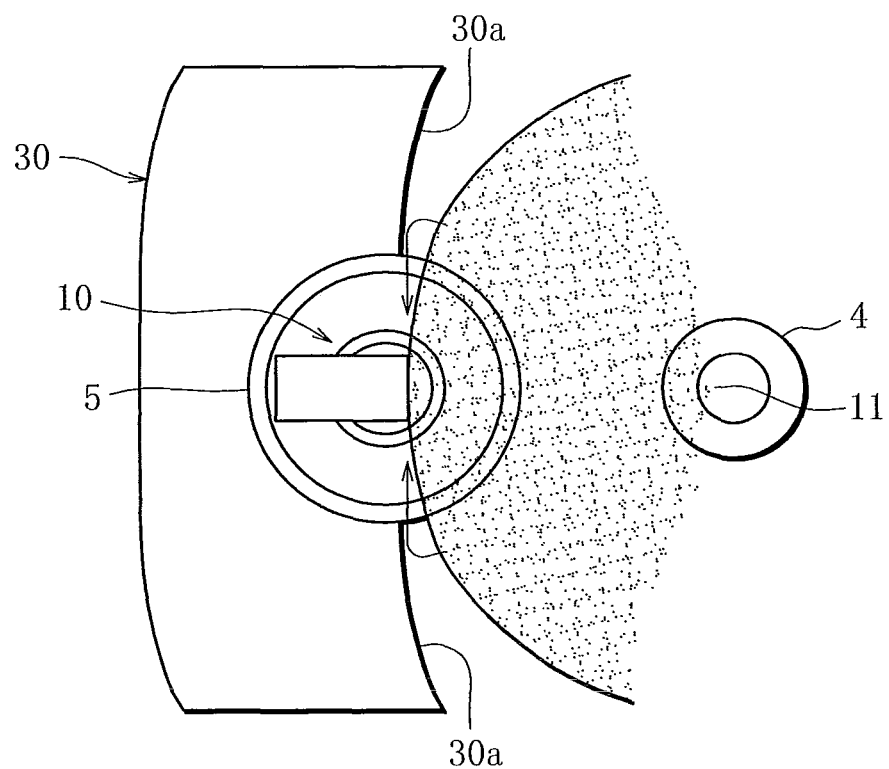
FIG. 6 shows an upper part of a combustion chamber according to another embodiment of the present invention as viewed from below.
Figure 7:
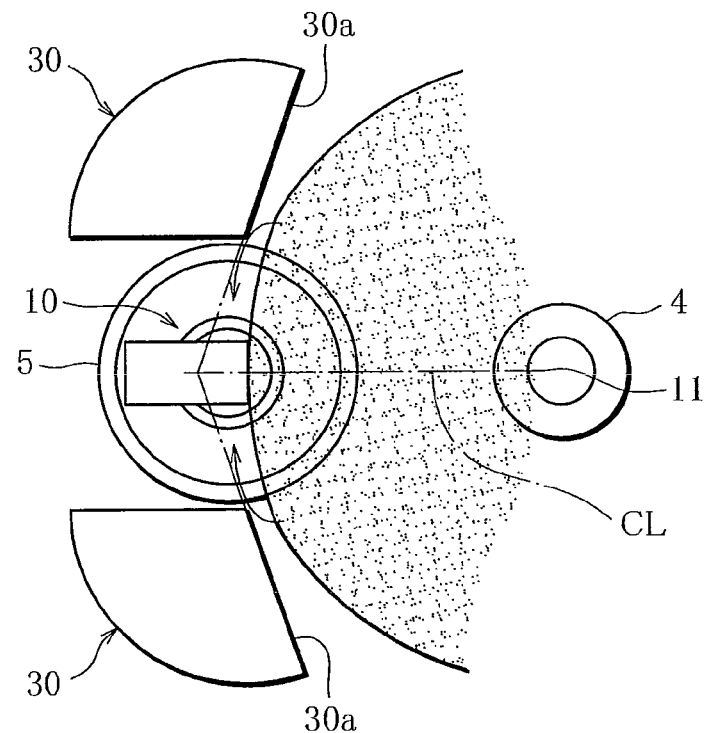
FIG. 7 shows an upper part of a combustion chamber according to still another embodiment of the present invention as viewed from below.

FIGS. 6 and 7 illustrate upper parts of combustion chambers according to other embodiments of the present invention as viewed from below.

In accordance with the present invention, a single spray control post 30 may be provided as shown in FIG. 6. Also, as seen from FIG. 6, each first side face 30a facing the injection nozzle 11 may be formed as an arcuate surface. Further, as shown in FIG. 7, each spray control post 30 may have a sector-shaped cross-sectional form with a central angle greater than 90° so that the first side face 30a may be inclined with respect to the line CL connecting between the electrode section 10 and the injection nozzle 11 of the fuel injection valve 4. In this case, out of the fuel spray colliding with the spray control posts 30, a greater amount of the fuel spray can be guided to the electrode section 10.

Figure 8:
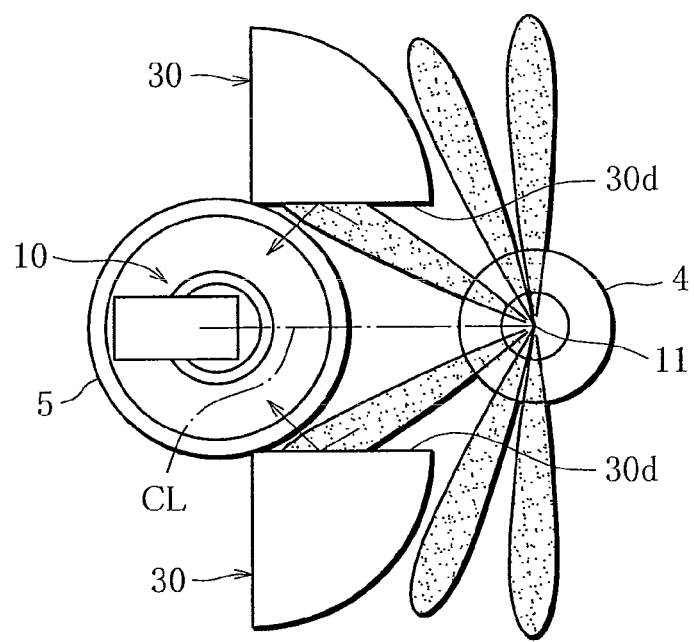
FIG. 8 shows an upper part of a combustion chamber according to yet another embodiment of the present invention as viewed from below.

FIG. 8 illustrates still another embodiment of the present invention. In this embodiment, a pair of spray control posts 30 are situated between the electrode section 10 and the injection nozzle 11 of the fuel injection valve 4 so as to be closer to the electrode section 10. Namely, the spray control posts 30 are located on both sides of the line CL connecting between the electrode section 10 and the injection nozzle 11. Also, the spray control posts 30 are positioned such that the side face 30d of one spray control post 30 and the side face 30d of the other spray control post 30 face each other. Further, the injection nozzle 11 of the fuel injection valve 4 injects fuel in a plurality of different radial directions. Among the multiple sprays injected in the respective different directions, two sprays are directed toward the side faces 30d of the respective spray control posts 30, whereby the injected fuel sprays are reflected by the respective side faces 30d and guided to the electrode section 10, as indicated by arrows in the figure.

In the embodiment illustrated in FIG. 6, 7 or 8, the flow obstructing wall 40 (wall member) may be provided as in the second embodiment in such a manner that the flow obstructing wall 40 is located on the line CL connecting between the electrode section 10 and the injection nozzle 11 of the fuel injection valve 4, to block the passage of the fuel spray or of an air current induced by the fuel spray. Since the flow obstructing wall 40 keeps the fuel spray from flowing directly to the electrode section 10, it is possible to reliably prevent the arc discharge from being blown out by the fuel spray and also to prevent smoldering combustion from taking place at the spark plug 5.

While the embodiments of the present invention have been described above, it is to be noted that the present invention is not limited to the foregoing embodiments alone. For example, although in the above embodiments, fuel is injected in the form of a cone like a curtain, the present invention is equally applicable to configurations in which fuel is injected in different forms. Also, the cross-sectional form of each spray control post 30 is not limited to sectorial but may be rectangular.

The invention claimed is:

1. A direct injection internal combustion engine, comprising:
    a fuel injection valve having an injection nozzle for injecting fuel directly into a combustion chamber;
    a spark plug including an electrode section arranged near an injection path along which a fuel spray injected from the fuel injection valve passes, the combustion chamber being configured so that a part of the injected fuel spray passes through a region including a distal end of the spark plug, and the spark plug being configured to spark when the injected fuel spray passes near the electrode section; and
    a guide member being arranged on either side of a line connecting the injection nozzle of the fuel injection valve and the electrode section and having a flat first side face opposing the injection nozzle of the fuel injection valve and guiding, into the electrode section, at least a part of the injected fuel spray so as to be guided from the fuel injection valve toward regions laterally outward of the spark plug by using the flat first side face, wherein
    the guide member includes a pair of post-like members arranged on a portion of a cylinder head fitted with the spark plug, so as to correspond in position to the combustion chamber,
    the pair of post-like members are arranged on both sides of the electrode section, respectively, such that the flat first side face of each post-like member faces the injection nozzle of the fuel injection valve, and are arranged near the electrode section such that a second side face of one of the post-like members faces a second side face of the other of the post-like members, and
    in each of the pair of post-like members, the flat first side face is perpendicular to the second side face, and is perpendicular to a line connecting an injection nozzle of the fuel injection valve and the electrode section.

2. The direct injection internal combustion engine according to claim 1, wherein in each of the pair of post-like members, the second side face is parallel to the line connecting the injection nozzle and the electrode section.

3. The direct injection internal combustion engine according to claim 1, wherein the guide member extends downward from a lower surface of a cylinder head such that a bottom tip of the guide member is situated at substantially the same level as the line connecting the injection nozzle of the fuel injection valve and the electrode section.

* * * * *